US 8,836,858 B1

(12) United States Patent
Harris (10) Patent No.: US 8,836,858 B1
(45) Date of Patent: Sep. 16, 2014

(54) METHOD AND APPARATUS FOR PERFORMING MULTI-CADENCE DETECTION IN A MOTION ADAPTIVE VIDEO DEINTERLACER

(71) Applicant: Altera Corporation, San Jose, CA (US)

(72) Inventor: Jon Michael Harris, North Stoke (GB)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/679,382

(22) Filed: Nov. 16, 2012

(51) Int. Cl.
*H04N 7/01* (2006.01)

(52) U.S. Cl.
CPC .................................... *H04N 7/01* (2013.01)
USPC .......................................... 348/448; 348/452

(58) Field of Classification Search
CPC ....... H04N 7/0142; H04N 7/01; H04N 7/012; H04N 7/0115; H04N 7/0137; H04N 7/0112; H04N 7/0135; H04N 7/014; H04N 5/144; G06T 3/4007; G06T 2207/10016
USPC .................. 348/441, 448, 458, 459, 451, 452
IPC ............................................. H04N 7/01, 11/20
See application file for complete search history.

(56) References Cited

U.S. PATENT DOCUMENTS

| | | | |
|---|---|---|---|
| 6,992,727 B2 | 1/2006 | Lin et al. | |
| 7,215,380 B2 | 5/2007 | Lin et al. | |
| 7,557,861 B2 | 7/2009 | Wyman | |
| 8,004,607 B2 * | 8/2011 | Eymard et al. | 348/452 |
| 8,243,195 B2 * | 8/2012 | Eymard et al. | 348/448 |
| 8,619,187 B2 * | 12/2013 | Garg et al. | 348/448 |
| 2002/0171759 A1 | 11/2002 | Handjojo et al. | |
| 2004/0119890 A1 | 6/2004 | Lin et al. | |
| 2004/0207752 A1 | 10/2004 | Lin et al. | |
| 2005/0168634 A1 | 8/2005 | Wyman et al. | |
| 2005/0168653 A1 | 8/2005 | Wyman | |
| 2007/0291169 A1 | 12/2007 | Eymard et al. | |

OTHER PUBLICATIONS

U.S. Appl. No. 13/558,673, filed Jul. 26, 2012, In Re Application of Harris, et al.

* cited by examiner

*Primary Examiner* — Sherrie Hsia
(74) *Attorney, Agent, or Firm* — L. Cho (57) ABSTRACT

A method of deinterlacing an interlaced video having a plurality of fields is described. The method includes detecting cadence of each pixel of each of the fields of the interlaced video. The interlaced video is then deinterlaced in accordance with the cadence, if any, of each of the pixels of each of the fields of the interlaced video. A pixel-based multi-cadence detection method is also described. Moreover, a pixel-based multi-cadence detection apparatus is also described.

21 Claims, 9 Drawing Sheets

METHOD AND APPARATUS FOR PERFORMING MULTI-CADENCE DETECTION IN A MOTION ADAPTIVE VIDEO DEINTERLACER

TECHNICAL FIELD

Embodiments of the present invention relate to video deinterlacing. More specifically, embodiments of the present invention relate to a method and apparatus for performing pixel-based multi-cadence detection in a motion adaptive video deinterlacer.

BACKGROUND

An interlaced video is a succession of approximately 50 or 60 fields per second with each of the fields carrying only the alternating rows displayed in each frame of the video. Interlaced video is often derived from motion picture film materials photographed in a 24 or 30 frames-per-second progressive manner for display on cathode ray tube (CRT) type of displays. Interlacing is generally performed to achieve bandwidth reduction, but results in a reducing picture display quality. However, because the reduction in picture display quality from interlacing is not very noticeable on CRT displays, interlacing has been used as an elementary compression technique for CRT displays.

As most of today's digital television displays require progressive video inputs, all video materials in the interlaced format need to be converted to a progressive video format in order to be properly displayed on the digital TV displays. This process is referred to as deinterlacing. One typical deinterlacing technique is known as field combination (or weaving) which simply combines the appropriate fields together to restore the original images.

To weave the correct fields together, the deinterlacer needs to detect cadence of the interlaced video. Cadence generally refers to a pattern of successive fields that correspond to the frames of the original video (i.e., conversion pattern). If the cadence cannot be properly detected, the deinterlacer will not be able to properly weave the correct fields together and may discard video data erroneously.

The detection of cadence may be complex and difficult. For example, motion picture film is typically progressive and is based on 24 frame-per-second sequence while the NTSC format for TV broadcast is 60 fields per second. To convert a motion picture film into an interlaced video in NTSC format, a 3:2 pull-down repeating cadence is used to generate three fields from one film frame and two fields from the next film frame. In addition, sometimes every twelfth field is dropped to accelerate the film and fit the film within a given time slot. This loss results in a 3:2:3:2:2 repeating cadence.

Moreover, although the 3:2 repeating cadence is the most common format, other repeating cadences (e.g., 2:2, 2:3:3:2, and 3:3) may also be used to interlace the progressive original film. It is also possible that an interlaced video may have one portion of the video interlaced with a 3:2 cadence while having another portion of the interlaced video converted with a different cadence (e.g., 2:2 or 3:3). It is also possible that an interlaced video does not have any cadence. Furthermore, it is also possible that a field of an interlaced video contains both cadenced content and un-cadenced content. For example, in the case of a foreign film where subtitles (un-cadenced content) are overlaid on top of the original film content (cadenced content).

SUMMARY

According to an embodiment of the present invention, a method of deinterlacing an interlaced video with a plurality of fields first detects motion and cadence of the interlaced video by detecting the motion and cadence of each pixel of each of the fields of the interlaced video. The interlaced video is then deinterlaced in accordance with the motion and cadence of each of the pixels of each of the fields of the interlaced video.

According to another embodiment of the present invention, a method of detecting cadence of a pixel of a current field of an interlaced video first identifies the pixel in the current field. A first and a second preceding field of the current field and a subsequent field of the current field are then identified. The first preceding field and the subsequent field are adjacent to the current field while the second preceding field is adjacent to the first preceding field. A pixel matrix centered on the position of the pixel in the current field is then obtained for each of the fields. The cadence of the pixel is then detected by (1) determining if the pixel matrix of the current field matches the pixel matrix of one of the first and second preceding fields that is of the same type as the current field, and (2) determining comb factor between the pixel matrix of the current field and the pixel matrix of the first preceding field and the subsequent field.

According to yet another embodiment of the present invention, a deinterlacing apparatus includes a motion and cadence detection module to detect motion and cadence of a pixel in a field of an interlaced video that includes a plurality of consecutive fields. A field combination deinterlacing module is used to deinterlace each pixel in accordance with the cadence detected for that pixel if the motion and cadence detection module detects cadence in the pixel. A field extension deinterlacing module is used to deinterlace the pixel if the motion and cadence detection module does not detect cadence in the pixel.

BRIEF DESCRIPTION OF THE DRAWINGS

The features and advantages of the present invention are illustrated by way of example and are by no means intended to limit the scope of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
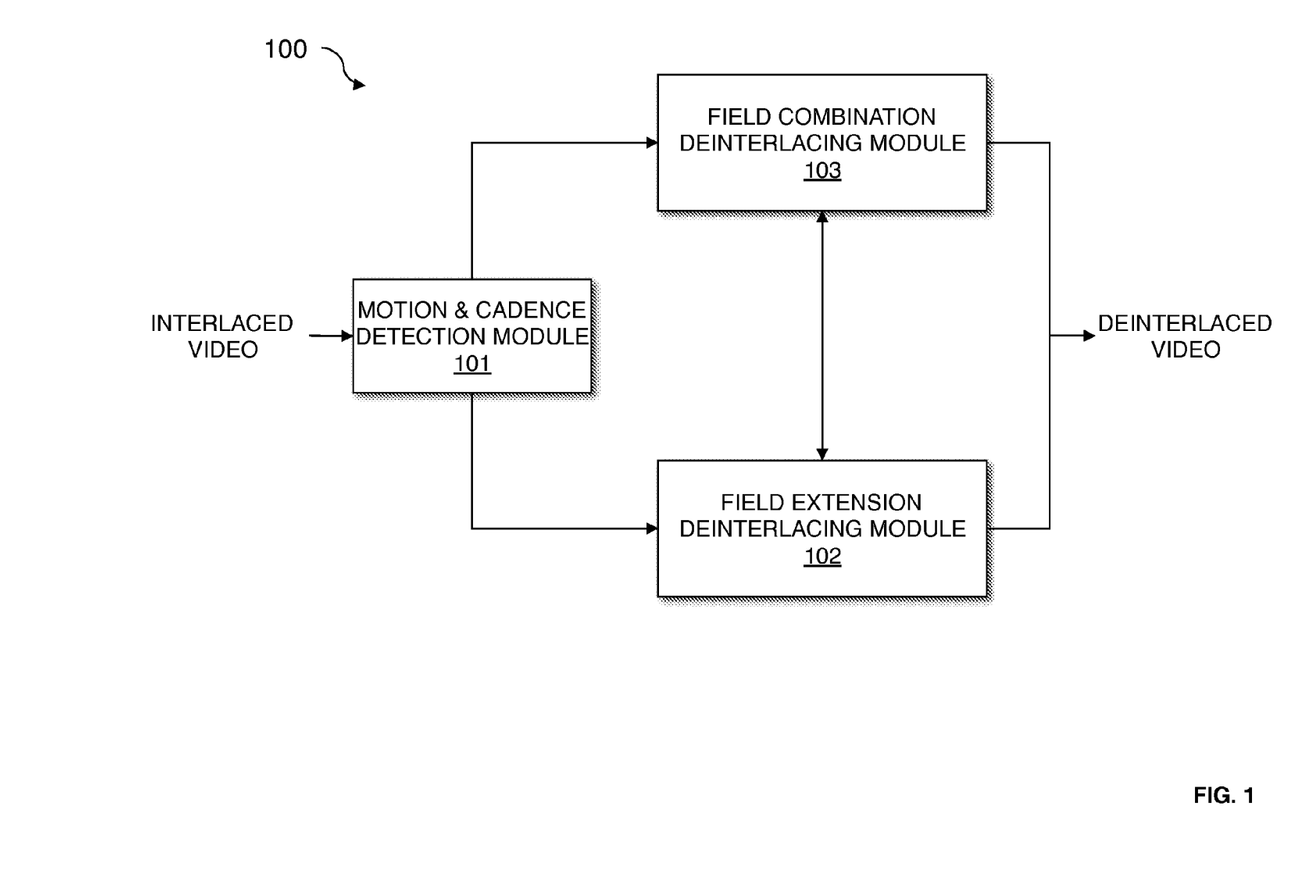
FIG. 1 illustrates a motion adaptive deinterlacer that includes a pixel-based motion and cadence detection module according to an exemplary embodiment of the present invention.

FIG. 1 is a block diagram of a motion adaptive video deinterlacer 100 that includes a motion and cadence detection module 101, a field extension deinterlacing module 102, and a field combination deinterlacing module 103 according to an exemplary embodiment of the present invention. According to an embodiment of the present invention, the motion and cadence detection module 101 detects motion of each pixel in a field of an interlaced video, and includes a multi-cadence detection logic (shown in FIG. 3) that implements an efficient pixel-based multi-cadence detection scheme that detects cadence of each pixel within a field. This pixel-based multi-cadence detection scheme enables the multi-cadence detection logic to detect multiple types of cadence, if any, between different fields of the interlaced video applied to the deinterlacer 100, and at the same time detect multiple simultaneous different cadences, on a per-pixel basis, within a single field in the interlaced video.

According to one embodiment of the present invention, the multi-cadence detection logic combines the use of pixel kernel (also referred to as pixel matrix) matching and comb factor calculation for cadence detection with an efficient scheme for storing the cadence state information along with the detected motion value for each pixel within a field. In other words, the multi-cadence detection logic identifies a pixel in a field (also referred to as current field) to be measured. The multi-cadence detection logic then performs match comparison and comb factor comparison operations for the pixel over a kernel (or matrix) of 3×3 pixels (or 5×5 pixels or 7×7 pixels or other numbers) over four fields centered on the pixel to be measured. The four fields include the current field, a first preceding field (also referred to as past adjacent field) that is adjacent to the current field, a second preceding field (also referred to as past field) that is adjacent to the first preceding field, and a subsequent field (also referred to as subsequent adjacent field or next field) that is also adjacent to the current field but appears after the current field in time. The cadence information is then combined with or attached to the motion value of the pixel into a single data packet and stored in a memory before being used for deinterlacing. The efficiency is reflected both in savings in silicon area in implementing the scheme in hardware and memory footprint when storing the motion value and cadence information. The deinterlacer 100 and its motion and cadence detection module 101 in accordance with embodiments of the present invention will be described in more detail in conjunction with FIGS. 1 through 9.

Throughout the specification, the follow terms are defined as follows.

The term "film", "motion picture film", or "movie" refers to a sequence or series of still or moving photographic images recorded by cameras on film stock.

The term "video" refers to a sequence of image frames that are electronically captured, recorded, processed, stored, transmitted, and/or reconstructed. Like film, video has a frame rate, which refers to the number of frames per second. Video is displayed on electronic analog displays (e.g., CRT display) or electronic digital displays.

Video can be interlaced or progressive. The term "interlace" (or "interlacing" or "interlaced") refers to the process of splitting a video frame into consecutive video fields, namely an odd field and an even field. The odd field includes all the odd-numbered horizontal scan lines within the video frame and the even field includes all the even-numbered horizontal scan lines within the video frame. The odd field can also be referred to as upper field and the even field can also be referred to as lower field. Thus, an interlaced video includes a sequence of video fields. All the odd fields are of the same type and all the even fields are of the same type.

On the other hand, a progressive video includes a sequence of video frames that can be displayed on progressive scan display systems (e.g., digital TV display or digital projector). The progressive scan display system updates all of the scan lines of each frame in sequence in each refresh period. When displaying a natively progressive broadcast or recorded signal, the display result is optimum spatial resolution of both the stationary and moving parts of the image. When displaying a natively interlaced video, however, overall spatial resolution will be degraded by simple line doubling and artifacts such as "staircasing of diagonals" effects and lost resolution of images will be seen unless deinterlacing is applied to eliminate them. However, "combing" artifacts will result if the deinterlacing applied is a simple deinterlacing technique that, for example, incorrectly or erroneously combines fields together.

The term "combing" or "combing effect" indicates comb-shaped (or saw-tooth-like) patterns that are caused by alternate lines in a frame being slightly displaced from each other, thus resulting in jagged edges. The combing effect can be caused by many factors. For example, motion of subjects between video fields causes combing effect in that the slight differences between two fields due to the motion will make the alternate lines displaced from each other from frame to frame. As another example, combining or weaving improper fields together will result in combing effect in the improperly combined frame.

The term "pixel comb factor" (or simply comb factor) refers to a value indicating whether the combing effect of a pixel matrix or kernel (e.g., a 3×3 or 5×5 or 7×7 pixel matrix) centered on a pixel in a combined frame exceeds a predetermined threshold. The pixel comb factor can have a "high" indication when the combing effect value of the pixel matrix exceeds the predetermined threshold, and have a "low" indication when the combing effect value of the pixel matrix does not exceed the predetermined threshold.

The term "frame comb factor" refers to a value indicating whether there are more pixel comb factors in a combined frame than permitted by a predetermined threshold. Thus, the frame comb factor is an accumulated metric for the pixel comb factors of all the pixels in the frame. The frame comb factor can have a "high" indication when the accumulated pixel comb factors of a frame exceed the predetermined threshold, and have a "low" indication when the accumulated pixel comb factors of the frame do not exceed the predetermined threshold.

The term "cadence" refers to a pattern of successive fields that correspond to the frames of the original video (i.e., conversion pattern). Cadence is used in the telecine process for converting movie content to video format, as well as in the process of restoring the interlaced video to the original frame sequence. Cadence indicates (1) the original format from which the interlaced video is derived, (2) frame rate conversion, if any, and (3) whether the interlaced video is an originally generated video (e.g., from a video camera). If the cadence cannot be properly detected from an interlaced video (or if cadence is not present in the interlaced video), the fields of the interlaced video will not be properly combined or weaved together. It should be appreciated, however, that a cadence need not necessary be present in an interlaced video. It also should be appreciated that an interlaced video may have different types of cadence for different portions of the interlaced video or multiple simultaneous cadences present within a field of the interlaced video.

Cadence detection is part of field combination deinterlacing which restores an interlaced video back to the original progressive frame sequence using field combination or weaving techniques. The deinterlacing can be used to reverse the telecine process that converted movies into interlaced video back into the progressive scan sequence. In order to properly apply the correct deinterlacing procedure, the deinterlacer must determine and detect the cadence of the interlaced video.

Referring to FIG. 1, the deinterlacer 100 receives an interlaced video and deinterlaces the interlaced video into a deinterlaced video. The interlaced video includes a number of consecutive fields that are created or generated according to multiple types of repeating cadences between different fields. For example, it is possible that the interlaced video may have one portion of the video interlaced with a 3:2 cadence while having another portion of the interlaced video converted with a different cadence (e.g., 2:2 or 3:3). As a further example, a portion of the interlaced video may not have any cadence. In addition, each of some of the fields of the interlaced video includes multiple simultaneous different cadences within the field. For example, it is possible that a field of the interlaced video contains both cadenced content and un-cadenced content (or content of different cadence) which overlays on top of the cadenced content.

In one embodiment, the deinterlacer 100 can be implemented using a single processing device or a number of processing devices. Such a processing device may be a microprocessor, co-processors, a microcontroller, digital signal processor, microcomputer, central processing unit, field programmable gate array (FPGA), programmable logic device, state machine, logic circuitry, analog circuitry, digital circuitry, and/or any device that manipulates signals (analog or digital) based on operational instructions that are stored in a memory device. Such a memory device can be a single memory device or multiple devices and can include a hard disk drive or other disk drive, read-only memory, random access memory, volatile memory, non-volatile memory, static memory, dynamic memory, flash memory, cache memory, and/or any device that stores digital information. It is to be noted that when the processing module implements one or more of its functions via a state machine, analog circuitry, digital circuitry, and/or logic circuitry, the memory storing the corresponding operational instructions may be embedded within, or external to, the circuitry including the state machine, analog circuitry, digital circuitry, and/or logic circuitry.

In another embodiment, the deinterlacer 100 is implemented in software form. In alternate embodiments, the deinterlacer 100 may be implemented in firmware form. In this case, the deinterlacer 100 is a circuit design template created using an electronic design automation tool. The circuit design template can then be finalized with user specified circuit parameters and is then programmed or implemented on an FPGA or other physical programmable target device.

The deinterlacer 100 may reside in or be used with a video device (not shown in FIG. 1). The video device can be a video converter box, a digital TV display, a digital video recorder, a digital video player, a video receiver, a computer, a monitor, a smart phone, a tablet computer, a video projector, or any other electronic device with video processing and display functions.

The field extension deinterlacing module 102 of the deinterlacer 100 is employed to deinterlace the interlaced video when the interlaced video includes motion (i.e., moving objects) in the video fields and a cadence is not detected. The field extension deinterlacing module 102 performs the deinterlacing function by extending the lines in each field to the entire screen into a complete frame. In addition and according to one embodiment of the present invention, the field extension deinterlacing module 102 may perform the field extension deinterlacing operation on a per-pixel basis. In this case, instead of performing the field extension deinterlacing operation on the entire field, the field extension deinterlacing module 102 applies the field extension deinterlacing operation to a pixel matrix (or kernel) centered on the pixel in question for deinterlacing to obtain the field extension result at the pixel in question (or for the pixel position above or below the pixel in question). In one embodiment, the pixel matrix is a 3×3 pixel matrix. In other embodiments, the pixel matrix can be of other pixel sizes such as 5×5 or 7×7.

There are many field extension deinterlacing techniques that the field extension deinterlacing module 102 can employ to deinterlace the interlaced video. For example, the deinterlacing technique employed by the field extension deinterlacing module 102 may be half-sizing which displays each field on its own, resulting in a video frame with half the vertical resolution of the original frame. Another field extension deinterlacing technique used by the field extension deinterlacing module 102 is line doubling which doubles the lines in each of the interlaced video fields into a complete frame. A further field extension deinterlacing technique used by the field extension deinterlacing module 102 includes interpolation which uses spatial filtering to generate extra lines. These techniques are all known and will not be described in more detail below.

The field combination deinterlacing module 103 of the deinterlacer 100 is employed to deinterlace the interlaced video when there is no motion detected between fields (i.e., the image has not changed between fields and/or do not include motion) or when a cadence is detected. When the interlaced video includes a single cadence between the fields, the field combination deinterlacing module 103 performs the field combination deinterlacing function by combining the lines in adjacent odd and even fields together to form a frame, according to cadence detected for the interlaced video. There are many field combination deinterlacing techniques that the field combination deinterlacing module 103 may employ to deinterlace the interlaced video. For example, the deinterlacing technique employed by the field combination deinterlacing module 103 may be weaving which adds consecutive fields (i.e., odd and even) together. Another field combination deinterlacing technique used by the field combination deinterlacing module 103 is blending which blends or averages consecutive fields to be displayed as one frame. Both weaving and blending are known field combination techniques and will not be described in more detail below.

Figure 8:
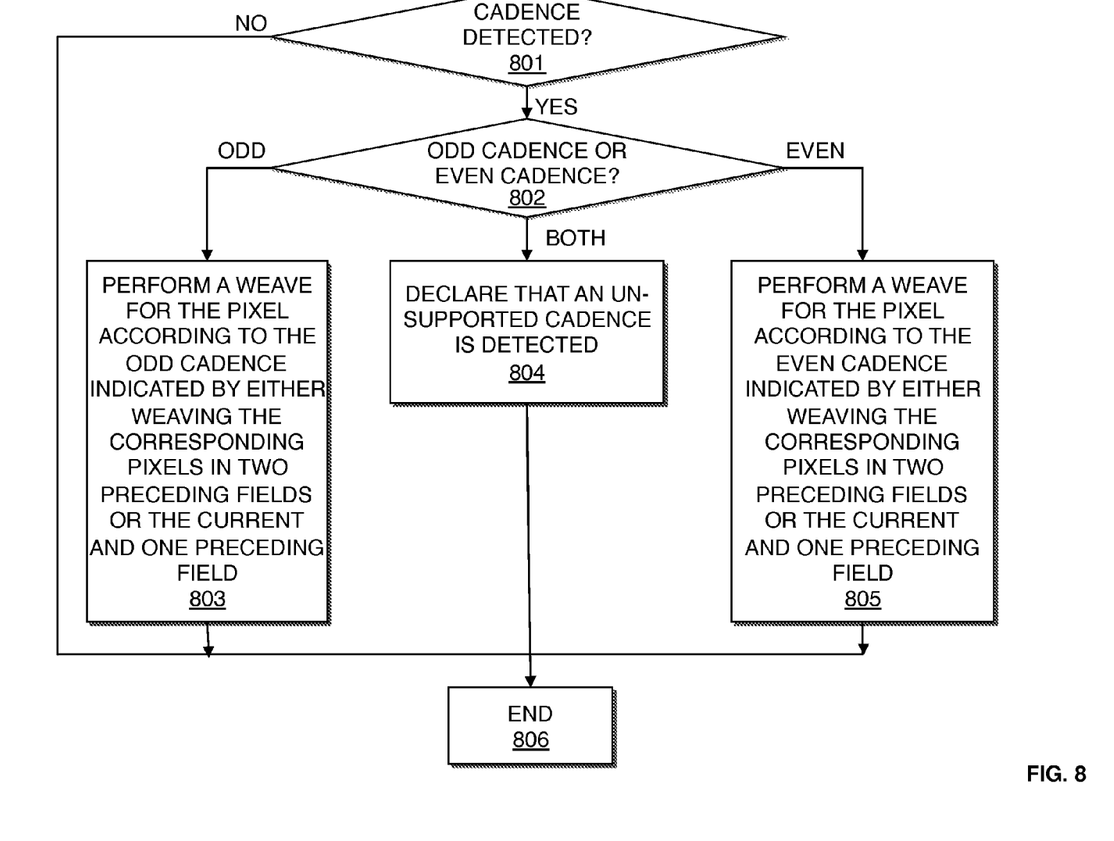
FIG. 8 is a flow chart diagram showing a field combination deinterlacing operation for a pixel performed by a field combination deinterlacing module in accordance with the cadence detected for the pixel according to an exemplary embodiment of the present invention.

According to one embodiment of the present invention and when the interlaced video applied to the deinterlacer 100 includes fields that are of different cadences and/or includes multiple cadences in a single field, the field combination deinterlacing module 103 of the deinterlacer 100 performs the field combination deinterlacing operation to the fields on a per-pixel basis. In this case, instead of performing the field combination deinterlacing operation for the entire field, the field combination deinterlacing module 103 applies the field combination deinterlacing operation to a pixel matrix (or kernel) centered on the pixel in question for deinterlacing to obtain the field combination result at the pixel in question (or for the pixel position above or below the pixel in question). In one embodiment, the pixel matrix is a 3×3 pixel matrix. In other embodiments, the pixel matrix can be of other pixel sizes such as 5×5 or 7×7. The procedure for performing the field combination deinterlacing operation by the field combination deinterlacing module 103 in accordance with an exemplary embodiment of the present invention is shown in FIG. 8, which will be described in more detail below.

The motion and cadence detection module 101 is used to detect motion and cadence of each of the pixels of each of the consecutive fields of the interlaced video, according to one embodiment of the present invention. The motion and cadence detection module 101 then combines the motion value and cadence in a single data packet for storage in memory before being applied to the field extension deinterlacing module 102 and the field combination deinterlacing module 103.

In accordance with one embodiment of the present invention, the motion and cadence detection module 101 efficiently detects cadence on a per pixel basis and restores both cadenced and un-cadenced frame elements with high fidelity. N different cadences may be detected, limited only by implementation restrictions. To accomplish this, the motion and cadence detection module 101 includes a per-pixel cadence detection logic (i.e., multi-cadence diction logic 304 shown in FIG. 3) and implements an efficient way of storing local cadence state in a set of cadence bits which are stored together with the motion bits.

In addition, the motion and cadence detection module 101 employs a local pixel matrix (or kernel) matching and local comb artefact determination scheme to determine a per-pixel cadence state. In other words, the multi-cadence detection logic within the motion and cadence detection module 101 identifies a pixel in a field (also referred to as current field) to be measured. The multi-cadence detection logic then performs match comparison and comb factor comparison operations for the pixel over a kernel (or matrix) of 3×3 pixels (or 5×5 pixels or 7×7 pixels or other numbers) over four fields centered on the pixel to be measured. The four fields include the current field, a first preceding field (also referred to as past adjacent field) that is adjacent to the current field, a second preceding field (also referred to as past field) that is adjacent to the first preceding field, and a subsequent field (also referred to as subsequent adjacent field or next field) that is also adjacent to the current field but appears after the current field in time.

The cadence information is then combined with or attached to the motion value of the pixel into a single data packet and stored in a memory before being used for deinterlacing. This means that the motion and cadence detection module 101 allows for storage of cadence state information along with motion bits to allow per-pixel detection of any cadence. The efficiency is reflected both in savings in silicon area in implementing the scheme in hardware and memory footprint when storing the motion value and cadence information. The structure and operation of the motion and cadence detection module 101 in accordance with one embodiment of the present invention will be described in more detail below, also in conjunction with FIGS. 2-8. It should be appreciated that the deinterlacer 100 illustrated in FIG. 1 illustrates an exemplary embodiment of the present invention and may include other types of deinterlacing components.

Figure 2:
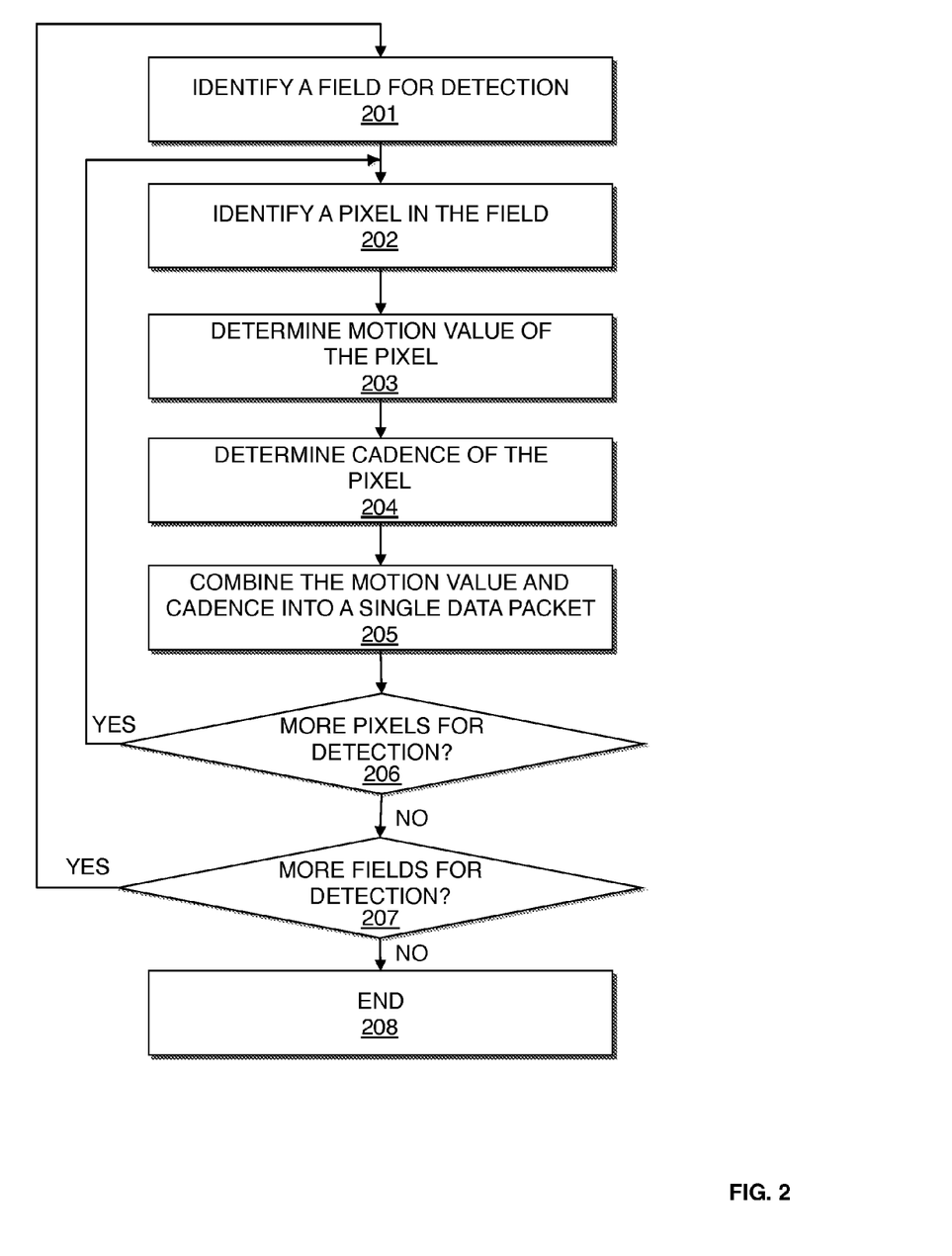
FIG. 2 is a flow chart diagram illustrating the procedure performed by a pixel-based motion and cadence detection module according to an exemplary embodiment of the present invention.

FIG. 2 is a flow chart diagram illustrating the procedure performed by a pixel-based motion and cadence detection module such as the motion and cadence detection module 101 of FIG. 1 according to an exemplary embodiment of the present invention. As can be seen from FIG. 2, the procedure starts at 201, at which a field is identified for both motion and cadence detection.

At 202, a pixel is identified in the field for both motion and cadence detection. In one embodiment, the pixel can be identified from the field randomly or according to a pre-defined order (e.g., first-in-first-out, last-in-first-out, or from-upper-right-to-lower-left). For efficiency purposes, the pixel is adjacent to a pixel that has been just identified for motion and cadence detection in the immediate past round.

At 203, the motion value of the pixel is detected and determined. As described above in connection with FIG. 1 and will be described below in connection with FIGS. 3-7, the motion detection involves the pixel matrix centered on the pixel and over four consecutive fields (i.e., the current field, the first and second preceding fields, and the subsequent field). In addition, the motion value of adjacent pixels (i.e., past motion values) of the pixel in question is also used to determine the motion value of the pixel.

At 204, the cadence of the pixel is determined. Like the motion detection, the cadence of the pixel is also determined over the pixel matrix centered on the pixel and between four consecutive fields (i.e., the current field, the first and second preceding fields, and the subsequent field), as described above in connection with FIG. 1 and will be described in more detail below in conjunction with FIGS. 3-7.

At 205, the motion value and cadence data of the pixel are combined into a single data packet with motion bits and cadence bits, as described above in connection with FIG. 1 and will be described in more detail below in conjunction with FIGS. 3-7.

At 206, it is determined if there are more pixels in the current field to be detected for motion and cadence. If the answer is yes, then the procedure returns to 202 to identify the next pixel for detection. If the answer is no, then the procedure continues to 207.

At 207, it is determined if there are more fields to be detected for both the motion and cadence information. If the answer is yes, then the procedure returns to 201. If no, then the procedure ends at 208.

Figure 3:
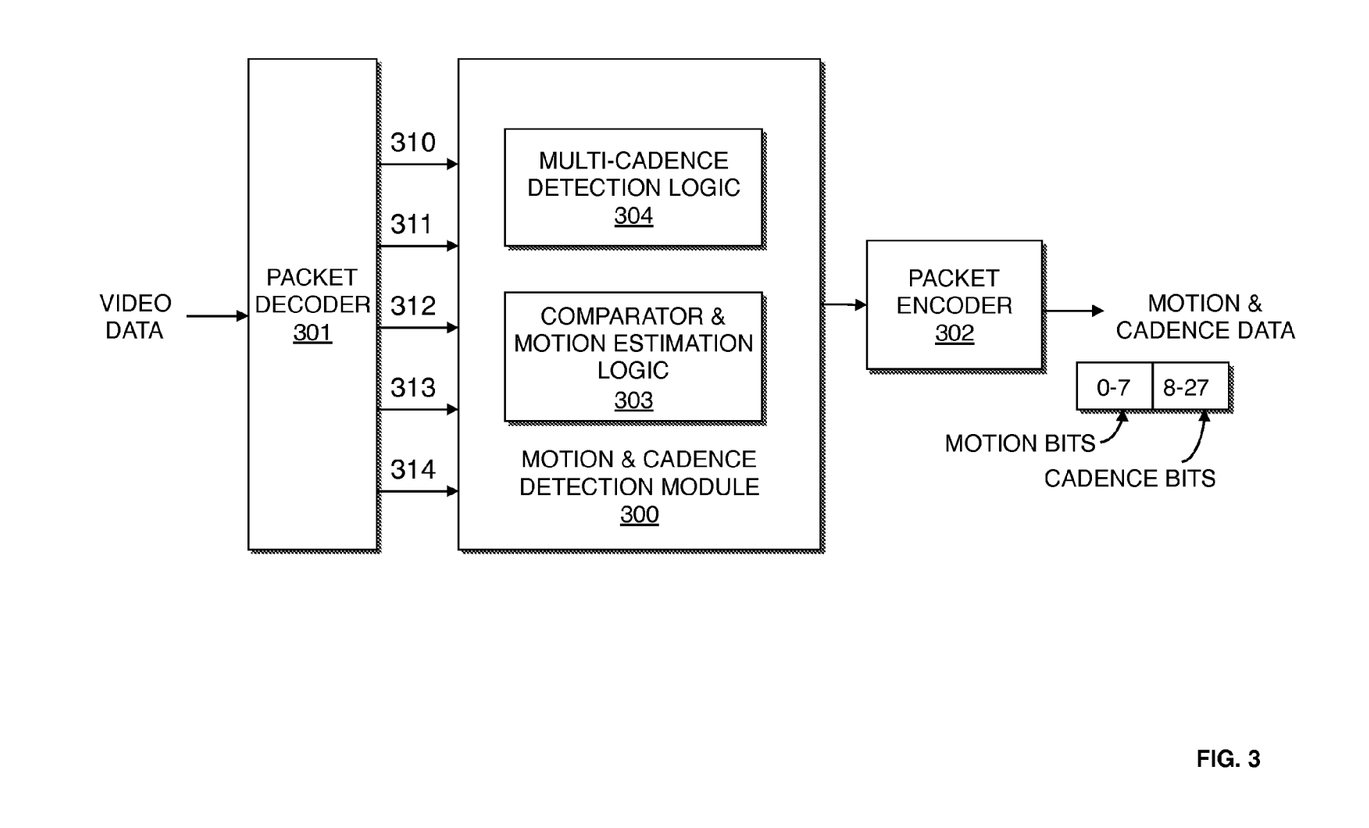
FIG. 3 is a pixel-based motion and cadence detection module that includes a pixel-based multi-cadence detection logic according to an exemplary embodiment of the present invention.

FIG. 3 illustrates a pixel-based motion and cadence detection module 300 that includes a pixel-based multi-cadence detection logic 304 according to an exemplary embodiment of the present invention. The pixel-based motion and cadence detection module 300 may be used to implement the motion and cadence detection module 101 of FIG. 1. As can be seen from FIG. 3, the pixel-based motion and cadence detection module 300 also includes a comparator and motion estimation logic 303. The comparator and motion estimation logic 303 is employed to detect motion in each pixel of a field and determine the motion value of that pixel. The multi-cadence detection logic 304 is used to detect cadence of each pixel in a field, according to one embodiment of the present invention. The combination of the comparator and motion estimation logic 303 and the multi-cadence detection logic 304 together allows for efficient per-pixel-based detection of any cadence. In addition, it allows for an efficient way of storing local cadence state of each pixel in a set of cadence bits along with motion bits of that pixel in a single data packet.

The pixel-based motion and cadence detection module 300 can be implemented in software, hardware, or firmware form. In one embodiment, the pixel-based motion and cadence detection module 300 is implemented using a single processing device. In doing so, the comparator and motion estimation logic 303 and the multi-cadence detection logic 304 are implemented by and integrated on a single processing device. Such a processing device may be a microprocessor, co-processors, a microcontroller, digital signal processor, microcomputer, central processing unit, field programmable gate array (FPGA), programmable logic device, state machine, logic circuitry, analog circuitry, digital circuitry, and/or any device that manipulates signals (analog or digital) based on operational instructions that are stored in a memory device.

In another embodiment, the pixel-based motion and cadence detection module 300 is implemented in software form that includes a plurality of software instructions stored in a memory or storage device and executed by a single processing device or a number of processing devices (e.g., a microprocessor, co-processors, a microcontroller, digital signal processor, microcomputer, or central processing unit).

In alternate embodiments, the pixel-based motion and cadence detection module 300 may be implemented in firmware form. In this case, the pixel-based motion and cadence detection module 300 is a circuit design template created using an electronic design automation tool. The circuit design template can then be finalized with user specified circuit parameters and is then programmed or implemented on an FPGA or other physical programmable target device.

Figure 4:
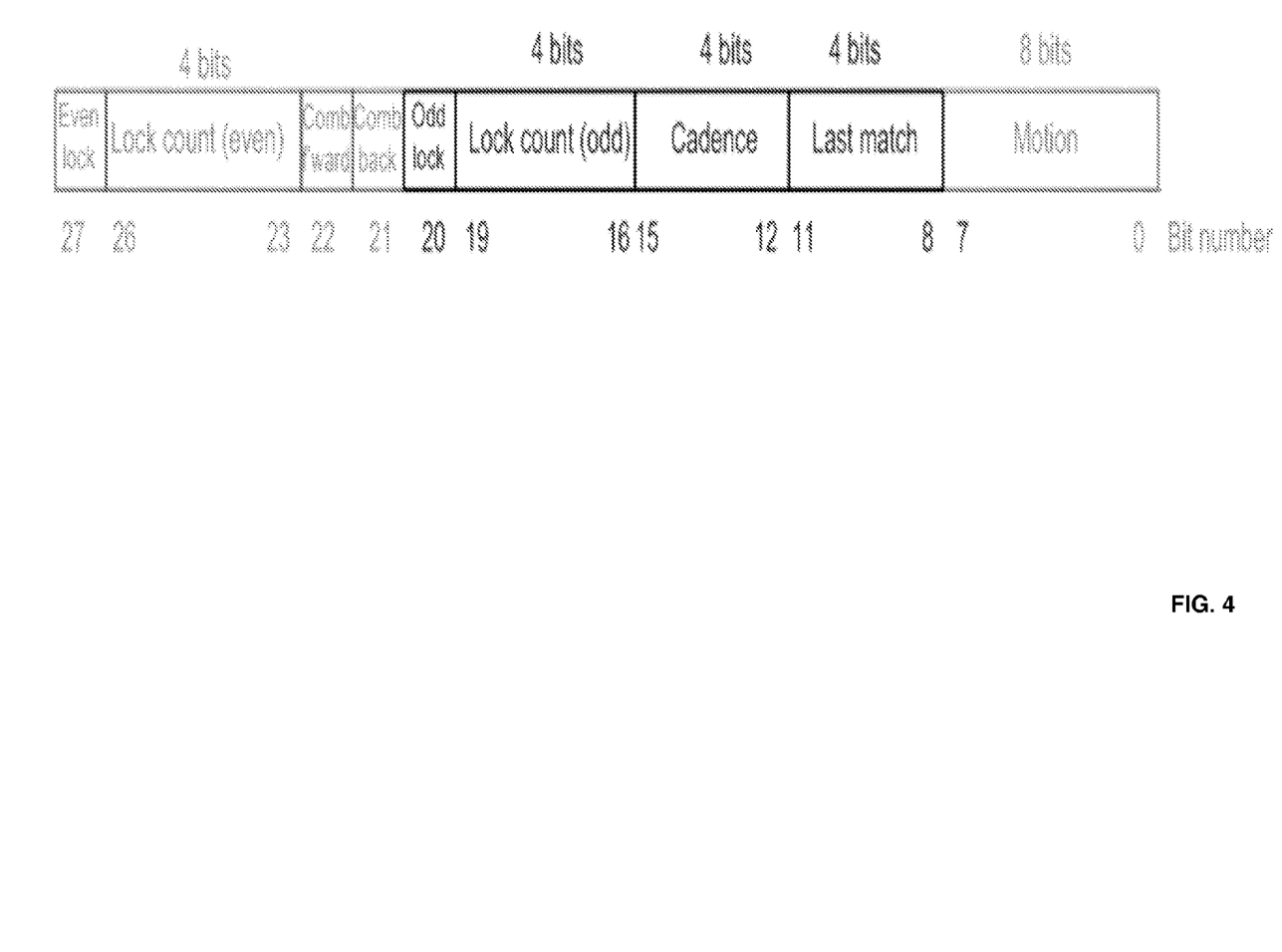
FIG. 4 illustrates the odd cadence data bits of a data format for a motion and cadence data packet generated by a pixel-based motion and cadence detection module according to an exemplary embodiment of the present invention.
Figure 5:
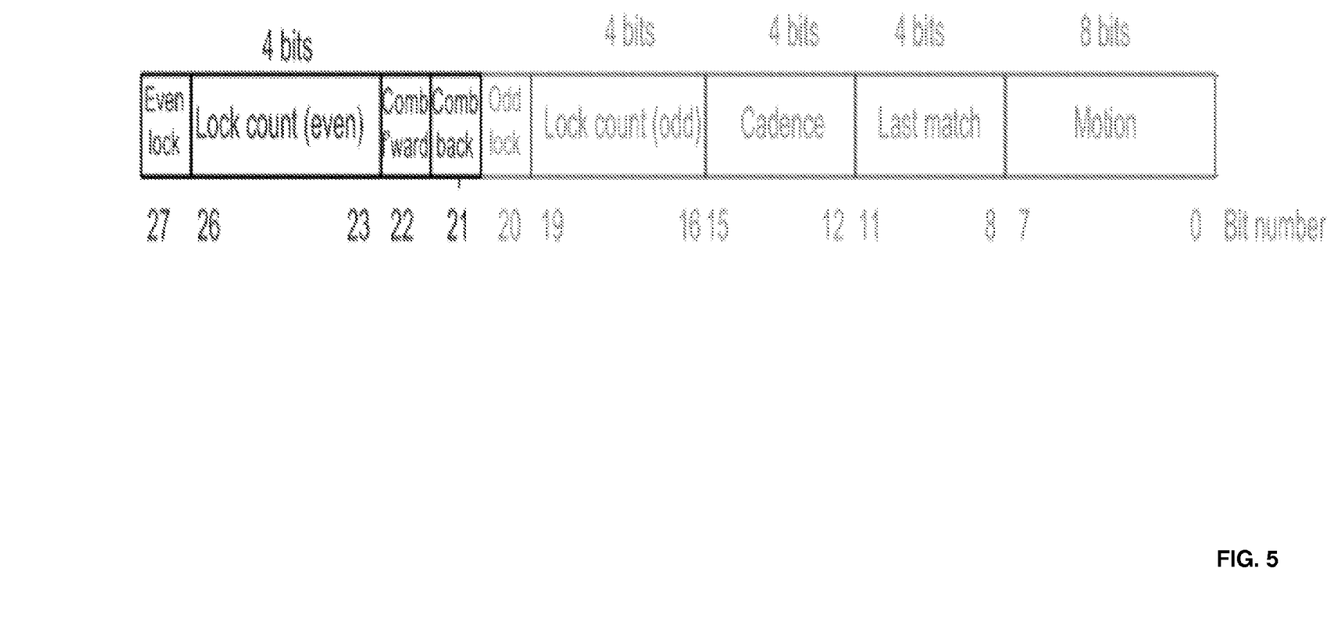
FIG. 5 illustrates the even cadence data bits of the data format of FIG. 4.

The pixel-based motion and cadence detection module 300 is connected to a packet decoder 301 and a packet encoder 302. The packet encoder 302 outputs the motion and cadence data of each pixel in a single data packet that includes motion bits and cadence bits. The packet encoder 302 may be connected to a memory (not shown) that stores the data packets of each pixel before being used for deinterlacing. As can be seen from FIG. 3, the format of the data packet for each pixel includes motion bits (i.e., bits 0-7) and cadence bits (bits 8-27). FIGS. 4-5 show the cadence data bits of the data format in more detail. FIG. 4 illustrates the odd cadence data bits of the data format while FIG. 5 illustrates the even cadence data bits of the data format.

As can be seen from FIG. 4, the odd cadence bits are from bit number 8 to bit number 20 of the data packet. The odd cadence bits are used to indicate an odd field cadence (i.e., where fields are periodically repeated, as in 3:2 cadence or 8:7 cadence). The odd cadence bits include a "last match" section from bit number 8 to bit number 11 (i.e., four bits), a cadence section from bit number 12 to bit number 15, a lock count section from bit number 16 to bit number 19, and an odd lock section of one bit (i.e., bit number 20). The "last match" section retains a count of how many fields have been seen since the pixel kernel last matched the equivalent kernel in the previous field. The cadence section indicates the cadence of the pixel. The lock count section indicates the continuity of the cadence from prior fields at the pixel position. The odd lock section indicates whether the detected cadence is an odd cadence.

As can be seen from FIG. 5, the even cadence bits are from bit number 21 to bit number 27 of the data packet. The even cadence bits are used to indicate an even field cadence (i.e., where frames need to be re-assembled from field-pairs, as in 2:2 cadence or 6:4 cadence). The even cadence bits include a "comb back" section at bit number 21, a "comb forward" section at bit number 22, a lock count section from bit number 23 to bit number 26 (four bits), and an even lock section of one bit (i.e., bit number 27). The "comb back" section indicates whether a "high" comb factor is recorded when weaving the pixel matrix of the current field with the pixel matrix of the first preceding field (i.e., "weave back") together. The "comb forward" section indicates whether a "high" comb factor is recorded when weaving the pixel matrix of the current field with the pixel matrix of the subsequent field (i.e., "weave forward") together. The sections are cleared, respectively, if the comb factor is "low" for the respective weavings. The lock count section indicates the continuity of a low-high (or high-low) comb factor value sequence from prior fields at the pixel position of the pixel for detection. If the current weaving back and weaving forward yield the same comb factor value pattern (e.g., low-high or high low), then the lock count is incremented. Otherwise, the lock count is reset. The even lock section indicates whether the detected cadence is an even cadence, and is set when the lock count in the lock count section reaches a threshold to declare even cadence. All the cadence bits and their associated updating operations will be described in more details below, also in conjunction with FIGS. 3 and 6-7.

Referring again to FIG. 3, the packet decoder 301 receives the interlaced video data for deinterlacing, decodes them into fields, and presents the field data, for example four fields at a time, to the motion and cadence detection module 300. The packet decoder 301 receives the video data in scan line sequence and then presents the field data of, for example and in one embodiment, four consecutive fields at a time to the motion and cadence detection module 300 via buses 311-314. In other embodiments, more or fewer than four consecutive fields may be sent at a time to the motion and cadence detection module 300. The received fields in the motion and cadence detection module 300 are consecutive in time and are adjacent to each other. At any given time point, the fields include a current field (i.e., current with respect to the giving time point), a first preceding field (prior to the current field at the giving time point) which is immediately adjacent to the current field, a second preceding field (prior to the first preceding field at the giving time point) which is immediately adjacent to the first preceding field, and a subsequent field which immediately follows the current field and is adjacent to the current field. The bus 312 presents the current field while the bus 311 presents the subsequent field. The buses 313-314 present the first and second preceding fields, respectively.

In addition, the packet decoder 301 also receives motion data (or motion value data). The motion data are motion values of prior fields of the interlaced video that have been included in the interlaced video or determined by the motion and cadence detection module 300 for prior fields. Thus, the motion data are past motion value data. The past motion value data are presented by the packet decoder 301 to the motion and cadence detection module 300 via bus 310. The functions and structure of the packet decoder 301 and the packet encoder 302 are well known and will not be described in more detail below.

The packet encoder 302 is employed to combine the motion value data and the cadence data of the pixel together and to output the combined data in a single data packet. FIG. 3 also shows the data format of the data packet of the motion and cadence data. The functions and structure of the packet decoder 301 and the packet encoder 302 are well known and will not be described in more detail below.

The motion and cadence detection module 304 detects motion and cadence on pixel basis for each of the fields of the interlaced video. The motion and cadence detection module 304 does this by detecting the motion value and cadence for each of the pixels within a field. In one embodiment, the motion and cadence detection module 304 first employs the comparator and motion estimation logic 303 to obtain a pixel matrix (or kernel) from each of the received fields. In another embodiment, the motion and cadence detection module 304 obtains the pixel matrixes from each of the received fields.

The pixel matrix of the current field is an odd sized pixel matrix (e.g., 3×3, 5×5, or 7×7) centered on the pixel identified for motion and cadence detection at this time. The pixel matrix of the subsequent field and that of each of the first and second preceding fields is of the same matrix size as the pixel matrix of the current field and is centered on a pixel having a pixel position that corresponds to the position of the pixel in the current field. FIG. 4 shows these pixel matrixes according to one embodiment of the present invention.

Figure 6:
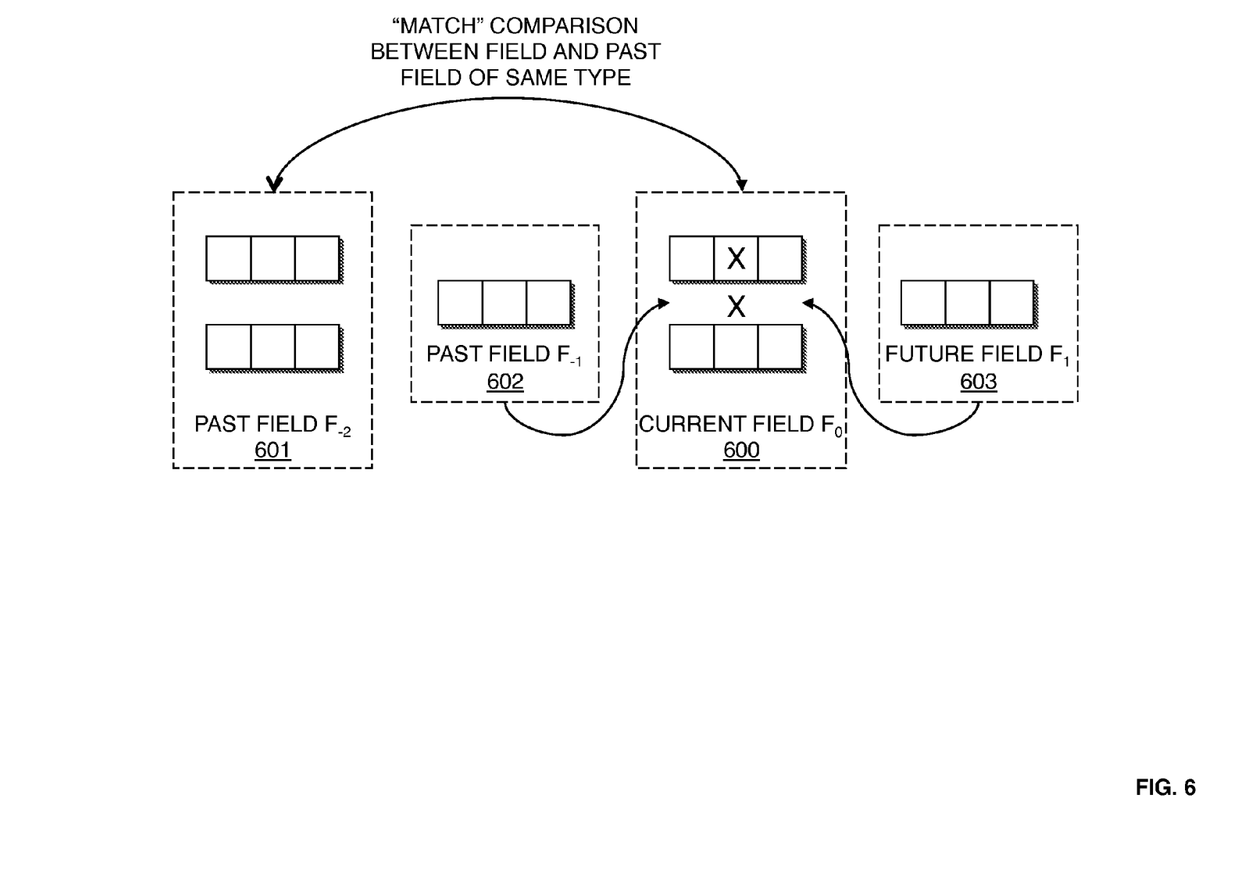
FIG. 6 illustrate a 3×3 pixel matrix (kernel) for four consecutive fields for a pixel-based cadence detection scheme performed by a pixel-based multi-cadence detection logic in accordance with one embodiment of the present invention.

As can be seen from FIG. 6, a pixel matrix 601 is obtained from the second preceding field. A pixel matrix 602 is obtained from the first preceding field while a pixel matrix 600 is obtained from the current field. A pixel matrix 603 is obtained from the subsequent field. In this example, the current field and the second preceding field is of the same type (i.e., odd or even field). The first preceding field and the subsequent field are of the same type. Thus, the pixel matrixes 600 and 601 are of the same type and the pixel matrixes 602-603 are of the same type, as shown in FIG. 6. There are six pixels in each of the pixel matrixes 600-601 while there are only three pixels in each of the pixel matrixes 602-603. This is purely for illustration purposes. In other examples, the current field may be of the same type with the first preceding field or is not of the same type with either of the first and second preceding fields.

In the pixel matrix 600, the lower symbol x indicates the pixel identified for motion and cadence detection. The upper symbol x in the pixel matrix 600 indicates an output of an adjacent pixel, either unmodified or replaced by the first preceding field pixel if performing a "weave past" operation (e.g., by the multi-cadence detection logic 304 of FIG. 3). This means that there are two pixel outputs for every round of cadence detection (or for every set of cadence detection) in case a "weave past" is required.

Referring now to FIGS. 3-6, when the pixel matrixes (e.g., 600-603 in FIG. 6) for the pixel are obtained, the comparator and motion estimation logic 303 (FIG. 3) first detects motion value of the pixel. As described above, the comparator and motion estimation logic 303 (FIG. 3) also receives the past motion value data to help detect motion value of the pixel. The comparator and motion estimation logic 303 buffers the pixel matrixes 600-603 (FIG. 6) and the past motion value data and may use a technique such as edge detection to find or detect motion between the pixel matrixes 600-603 (FIG. 6). It should be appreciated that other techniques such as Sum of Absolute Differences ("SAD") may be performed to find or detect motion where a sum of absolute differences is taken across multiple pixel matrixes, including from the indication of past motion value data. The detected motion value is then sent to the packet encoder 302 to be combined with the cadence data obtained from the multi-cadence detection logic 304 (FIG. 3) in a single data packet in which bit number 0-7 are the motion value of the pixel. The structure and the motion detection function of the comparator and motion estimation logic 303 (FIG. 3) can be implemented using known means and thus will not be described in more detail below.

Figure 7:
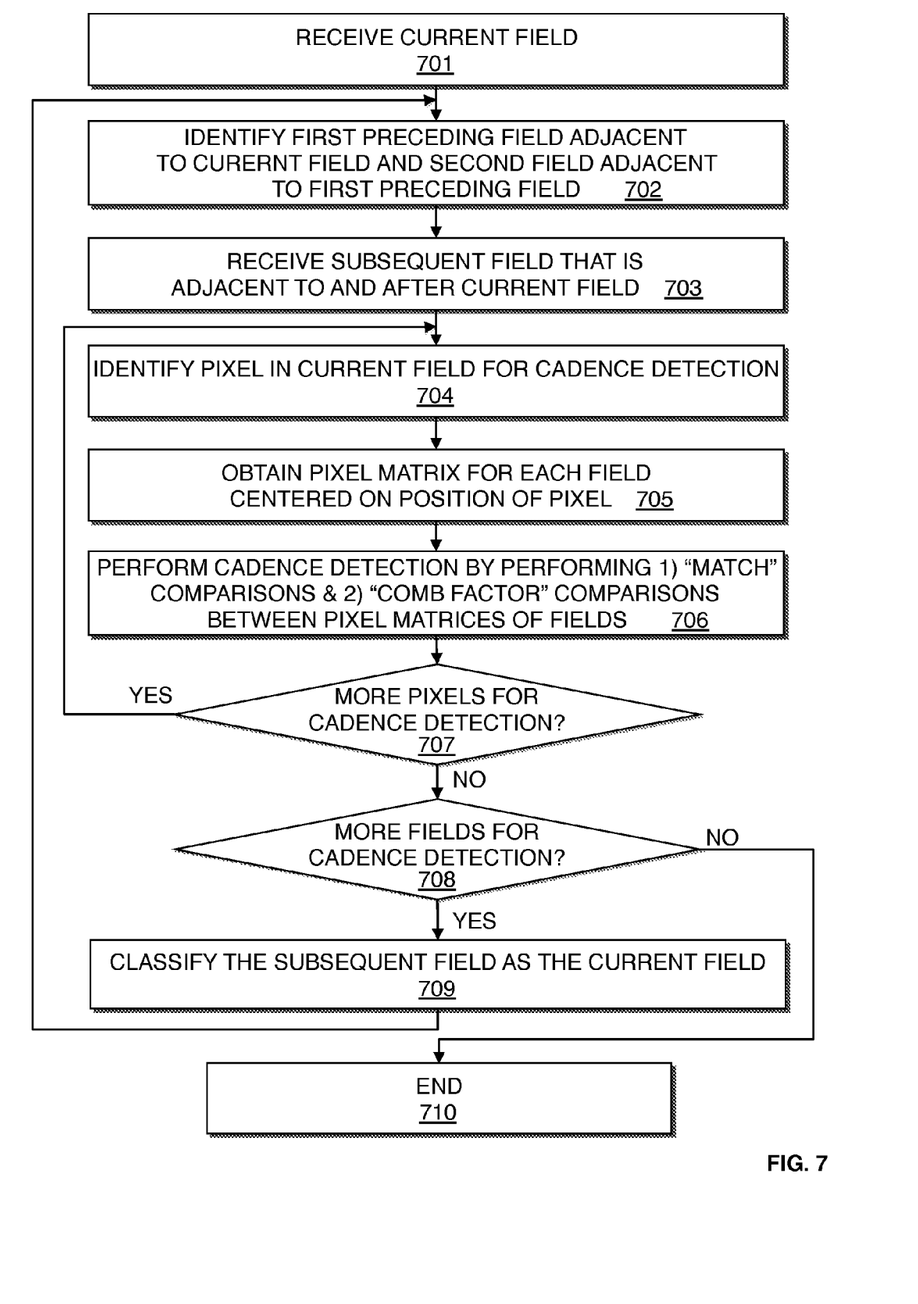
FIG. 7 is a flow chart illustrating the procedure of detecting cadence of a pixel by a pixel-based multi-cadence detection logic in accordance with one embodiment of the present invention.

The multi-cadence detection logic 304 detects cadence of the pixel (i.e., the pixel x in pixel matrix 600 in FIG. 6) by performing (1) a "match" comparison operation between the pixel matrix of the current field and the pixel matrix of one of the preceding fields that is of the same type as the current field (i.e., the pixel matrixes 600-601 in FIG. 6) and (2) a "comb factor" comparison operation between the pixel matrix of the current field (i.e., the pixel matrix 600 in FIG. 6) and the pixel matrix of each of the adjacent fields of the current field (i.e., the pixel matrixes 602-603 in FIG. 6). After the cadence of the pixel is detected, the multi-cadence detection logic 304 (FIG. 3) moves to identify the next pixel within the same field to detect the cadence of the next pixel and the procedure continues until all of the pixels within the field have been checked for their motion value and cadence. This procedure performed by the multi-cadence detection logic 304 is shown in FIG. 7, which will be described in more detail below.

As can be seen from FIGS. 3-6, the multi-cadence detection logic 304 (FIG. 3) performs the "match" comparison operation between pixel matrixes 600-601 (as they are of the same type) to see if the two pixel matrixes match each other. The "match" comparison operation is performed to determine if the cadence of the pixel is an odd cadence where some fields are periodically repeated (as in 3:2 or 8:7 cadence).

When a match occurs, the multi-cadence detection logic 304 checks to see if the odd lock bit (i.e., bit number 20 in FIG. 4) is set or not. If the lock bit is not set, the multi-cadence detection logic 304 (FIG. 3) performs a routine that tracks how many fields have elapsed since last match and to then determine whether a cadence condition exists, based upon a threshold value. There are many ways to implement the routine. The following routine shows one example of such implementation:

If the last match value (i.e., bits 8-11)>cadence (i.e., bits 12-15)>3, the cadence bits are set to the last match value, the lock count and last match bits are reset Else, if the last match value equals cadence, the lock count is incremented Otherwise cadence and lock count are reset and last match value is set to 1

When the lock count value exceeds a threshold, the lock bit is set.

If the lock bit is set, the multi-cadence detection logic 304 (FIG. 3) performs the following routine:

If the last match value equals cadence, the last match bits are reset

Otherwise the last match value is incremented.

However, if no match occurs when the lock bit is set and the last match value equals cadence, the lock, cadence and last match bits are all reset and cadence lock is lost.

In addition, the multi-cadence detection logic 304 (FIG. 3) also performs the "comb factor" comparison operation between pixel matrixes 600 and 602-603 (FIG. 6) to detect a field cadence where frames need to be re-assembled from field-pairs, as in 2:2 cadence or 6:4 cadence. This "comb factor" comparison operation is a two-pixel-matrix-pair comparison cadence detection scheme. In other words, the multi-cadence detection logic 304 (FIG. 3) weaves the pixel matrix 600 (FIG. 6) with the pixel matrix 602 (FIG. 6) (i.e., weave back) to determine the comb factor of the combined pixel matrixes. The multi-cadence detection logic 304 (FIG. 3) also weaves the pixel matrix 600 with the pixel matrix 603 (FIG. 6) (i.e., weave forward) to determine the comb factor of the combined pixel matrixes. The comb factor can have a high value and a low value. The high value comb factor indicates that the combined pixel matrix has more combing effects resulted from either motion in the fields or combining incorrect pixel matrix together. The low value comb factor indicates that the combined pixel matrix has less or no combing effect in the combined pixel matrix. It is worth noting that if motion in the field is providing a 'false indicator' of cadence, then the lock threshold comes into play as an even cadence is only declared when the pattern of combing fits that of a cadenced sequence over a number of frames. Statistically, motion would not falsely trigger a cadence state assuming a reasonable threshold value is used.

In one embodiment, the cadence detection logic 304 (FIG. 3) calculates the comb factor as follows. For each pixel in a line, the cadence detection logic 304 (FIG. 3) determines if the value of that pixel falls outside the range of a vertically interpolated pixel value. If it is determined that the value falls outside the range, then a high combing value is logged for that pixel (meaning displacement of the pixel that resulted in combing effect for that pixel). If the cadence detection logic 304 (FIG. 3) determines that the value does not fall outside the range, then a low combing value is logged for that pixel.

Once the combing value of all the pixels along the line has been calculated, the combing values for the next line of pixels are calculated using the procedure described above until all the pixels within the combined pixel matrix have been processed. After this is completed, the cadence detection logic 304 (FIG. 3) accumulates all the high combing values to determine the comb factor of the combined pixel matrix.

The multi-cadence detection logic 304 (FIG. 3) then writes the information into the even bits of the data packet (see FIG. 5). If the comb factor value is determined to be "high" for the combined pixel matrixes 600 and 602 (FIG. 6), the comb back bit is set. If the comb factor value is determined to be "high" for the combined pixel matrixes 600 and 603 (FIG. 6), the comb forward bit is set. They are cleared if the comb factor is low.

In addition, if the forward/back comb factors for the pixel matrix 600 (FIG. 6) are the inverse of the incoming comb bits, the lock count is incremented and the comb bits are updated. Otherwise the lock count is reset.

Once the comb factor sequence (i.e., the lock count in FIG. 5) has reached or exceeded a pre-determined threshold length, the cadence detection logic 304 (FIG. 3) declares the cadence to be even cadence and sets the even lock bit (see FIG. 5).

The pre-determined threshold length can be, for example, ten times (i.e., ten comb factor value pairs). A longer pre-determined threshold length will make the cadence detection more reliable, but will also mean a longer latency in the detection.

Comb bits of '11' for the pixel matrix 600 (FIG. 6) will reset the lock count and the lock bit, as this should never occur under an even cadence. Comb bits of '00' shall be ignored if the lock bit is set but shall reset the lock count if lock is not yet achieved.

FIG. 7 is a flow chart illustrating the procedure of detecting cadence of a pixel by a pixel-based multi-cadence detection logic in accordance with one embodiment of the present invention. The multi-cadence detection logic that performs the procedure shown in FIG. 7 can be the multi-cadence detection logic 304 of FIG. 3.

The procedure starts at 701 at which the current field of the interlaced video is received. In one embodiment, the current field is received from a buffer (or cache, storage, or memory). The buffer that receives the fields can be implemented in many different ways. For example, the buffer can be a line buffer for a motion detector that detects if the interlaced video includes motion.

If no field has been received, the current field can be the starting field. If fields have been received for detection, the current field can be the next field (or subsequent field, or the future field) of the last current field during the last round of motion and cadence detection for the previous field.

At 702, the first preceding and the second preceding fields of the current fields are identified. The first preceding field is adjacent to the current field and is the immediate past field of the current field. The second preceding field is adjacent to the first preceding field and is the immediate past field of the first preceding field.

At 703, the subsequent field of the current field is identified and received. The subsequent field is adjacent to the current field and is immediately after the current field.

At 704, a pixel in the current field is identified for cadence detection. The pixel can be the pixel that is next to a past pixel that has just gone through the cadence detection just prior to the identification of the pixel.

At 705, a pixel matrix centered on the pixel (or the same pixel position as the pixel) is obtained from each of the current field, the first and second preceding fields, and the subsequent field. This includes a pixel matrix from the current field that is centered on the pixel, a pixel matrix from each of the first and second preceding fields that is centered on a pixel having a pixel position that corresponds to the position of the pixel in the current field. Thus, four pixel matrixes are obtained from the four fields, each for one of the fields. In one embodiment, the pixel matrix has a pixel size of 3×3. In other embodiments, the pixel matrix may have different pixel sizes (e.g., 5×5 or 7×7).

At 706, the cadence of the pixel in the current field is detected. This is done by performing (1) a "match" comparison operation and a (2) "comb factor" comparison operation among the pixel matrixes of the four fields. The "match" comparison operation and the "comb factor" comparison operation can be the "match" comparison operation and the "comb factor" comparison operation described above, also in conjunction with FIGS. 3-6. The "match" comparison operation is employed to determine if the cadence is an odd cadence. The "comb factor" comparison operation is employed to determine if the cadence is an even cadence.

At 707, it is determined whether there are more pixels in the current field that need cadence detection. In other words, the procedure at 707 determines if all the pixels in the current field have been checked for their cadences. If there are pixels that have not gone through their cadence detection or do not have their cadences determined, then the procedure returns to 704. If there is not any pixel in the current field that needs cadence detection, then the procedure moves to 708.

At 708, it is determined whether there are more fields in the interlaced video that need to go through the cadence detection. If there are fields that need to go through the cadence detection, then procedure moves to 709. Otherwise, the procedure ends at 710.

At 709, the subsequent field is classified, marked, or identified as the current field. The procedure then returns to 702 to start a new round of pixel cadence detection for the new current field.

FIG. 8 illustrates a procedure for performing the field combination deinterlacing operation for a pixel of a field of an interlaced video according to an exemplary embodiment of the present invention. The procedure shown in FIG. 8 is performed by a field combination deinterlacing module such as the field combination deinterlacing module 103 of FIG. 1. FIG. 8 shows only a portion of the field combination deinterlacing operation as additional details may be mentioned in the below description.

The procedure starts at 801 at which a motion and cadence data packet for the pixel is received in the field combination deinterlacing module. The motion and cadence data packet takes the same format as shown in FIGS. 4-5. The motion and cadence data packet for the pixel is then checked to determine if the motion and cadence data packet indicates a motion value for the pixel. If there is a motion value detected for the pixel and there is no cadence detected, then the field combination deinterlacing operation will not take place. Instead, a field extension deinterlacing operation performed by a field extension deinterlacing module such as the field extension deinterlacing module 102 of FIG. 1 will be performed.

Moreover at 801, the motion and cadence data packet for the pixel is checked for cadence value of the pixel. If, at 801, no cadence is detected for the pixel (e.g., un-cadenced content), then the pixel will not receive the field combination deinterlacing operation and the procedure ends at 806. In this case, the field extension deinterlacing operation will be performed.

If, at 801, the motion and cadence data packet indicates that cadence is detected for the pixel (e.g., cadenced content), then the procedure continues to 802.

At 802, it is determined if the cadence detected indicates an odd cadence or an even cadence. As described above, a 3:2 cadence is an odd cadence. As another example, an 8:7 cadence is an odd cadence. The odd field cadence indicates that the fields of the interlaced video are periodically repeated. On the other hand, a 2:2 cadence is an even cadence and a 6:4 is an even cadence. The even field cadence indicates that frames need to be re-assembled from field pairs.

If, at 802, the motion and cadence data packet indicates an odd cadence (i.e., the odd cadence lock bit is set), then the procedure continues to 803. If, at 802, the motion and cadence data packet indicates an even cadence (i.e., the even cadence lock bit is set), then the procedure continues to 805. If, at 802, the motion and cadence data packet indicates the cadence is both an odd and an even cadence (i.e., an error condition), then the procedure continues to 804.

At 803, a field combination (or weave) operation is performed for the pixel according to the odd cadence detected. The weave operation weaves either the pixel matrixes of the two preceding fields or the pixel matrixes of the current field and one preceding field, depending on whether the "last match" bits of the data packet also indicate odd cadence. If the "last match" bits indicate odd cadence, then the pixel matrixes of the two preceding fields of the current field are weaved. If not, the pixel matrix of the current field is weaved with the pixel matrix of the adjacent preceding field (i.e., weave past). Two pixels are output for every set of calculations, in case a "weave past" (i.e., combining the pixel matrix of the current field with the pixel matrix of the immediate past (or preceding) field of the current field) is required.

At 804, because the detection indicates an unsupported cadence, all cadence bits in the data packet are cleared and the field extension deinterlacing operation is performed on the pixel.

At 805, a field combination (or weave) operation is performed for the pixel according to the even cadence detected. The weave operation weaves either the pixel matrixes of the two preceding fields or the pixel matrixes of the current field and one preceding field, depending on whether the calculated comb factor values for the pixel matrix of the current field are "01" (i.e., low, high). If the comb factor values for the pixel matrix of the current field are "01", then the pixel matrixes of the two preceding fields of the current field are weaved. If not, the pixel matrix of the current field is weaved with the pixel matrix of the adjacent preceding field (i.e., weave past). Two pixels are output for every set of calculations, in case a "weave past" (i.e., combining the pixel matrix of the current field with the pixel matrix of the immediate past or preceding field of the current field) is required.

Figure 9:
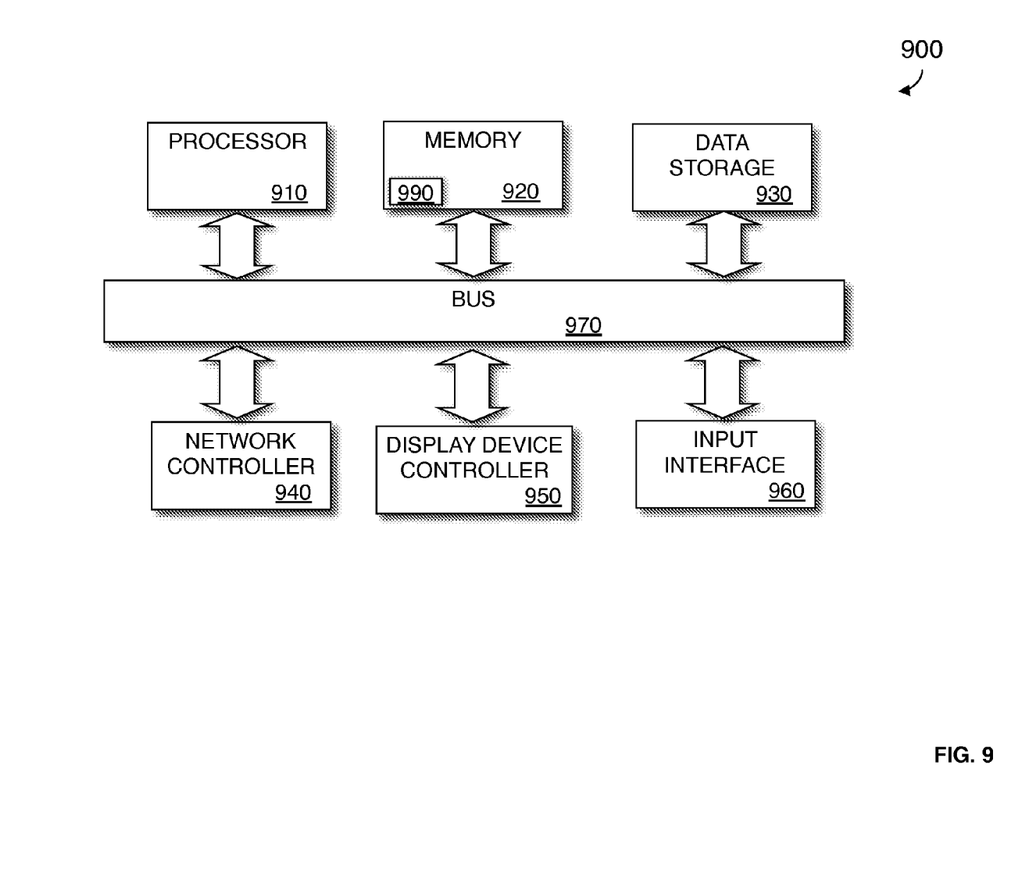
FIG. 9 illustrates a block diagram of a computer system that may be used to implement motion and cadence detection of an interlaced video according to one exemplary embodiment of present invention.

FIG. 9 is a block diagram of an exemplary computer system 900 in which an example embodiment of the present invention resides. The computer system 900, along with corresponding software program code 990 stored in the system 900, may be used to implement the deinterlacer 100 and the motion and cadence detection module 101 shown in FIG. 1, and/or the pixel-based multi-cadence detection logic 304 shown in FIG. 3. The computer system 900 includes a processor 910 that executes instructions and processes data. The processor 910 is coupled to a CPU bus 970 that transmits data and instructions between components and modules of the computer system 900. The bus 970 may be a single bus or a combination of multiple buses.

The computer system 900 also includes a memory 920, data storage 930, a network controller 940, a display device controller 950, and an input interface 960. The memory 920 may be a dynamic random access memory, a static random access memory, and/or other types of memory (e.g., flash memory). The memory 920 may store instructions and code 990 executed by the processor 910. The data storage 930 is coupled or connected to the bus 970. The data storage 930 may be a hard disk drive, a CD-ROM drive, a flash memory device, and/or other types of nonvolatile mass storage devices.

The network controller 940 is coupled or connected to the bus 970. The network controller 940 may link the computer system 900 to a network of computers (not shown) and supports communication among the computers. The display device controller 950 is also coupled or connected to the bus 970. The display device controller 950 allows coupling of a display device (not shown) to the computer system 900 and acts as an interface between the display device and the computer system 900.

The input interface 960 is coupled or connected to the bus 970. The input interface 960 may be, for example, a keyboard and/or cursor control device (e.g., mouse). The input interface 960 may also be a touch screen input interface, in one embodiment. In this case, the display device controller 950 and the input interface 960 may be integrated together as an integrated unit. The input interface 960 allows for input data and instructions to be transmitted from an input device to the computer system 900. It should be appreciated that the computer system 900 may be implemented with different architecture or has more or fewer or different components than those shown in FIG. 9.

FIGS. 2 and 7-8 are flow charts illustrating methods according to embodiments of the present invention. The techniques illustrated in these figures may be performed sequentially, in parallel or in an order other than what is described. The techniques may be also be performed once or more times. It should be appreciated that not all of the techniques described are required to be performed, that additional techniques may be added, and that some of the illustrated techniques may be substituted with other techniques.

Embodiments of the present invention may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, or encoding a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification embodiments of the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method of deinterlacing an interlaced video having a plurality of fields, comprising:
    detecting cadence of a pixel of a field from the fields of the interlaced video independent of other pixels of the field; and
    deinterlacing the interlaced video at the pixel in accordance with the cadence of the pixel detected.

2. The method of claim 1, further comprising:
    detecting motion value of the pixel; and
    combining the motion value and the cadence of the pixel into a single data packet for storage in memory before being used for deinterlacing.

3. The method of claim 2, wherein the deinterlacing further comprises
    performing a field combination deinterlacing operation to the pixel in accordance with the cadence detected if the motion value for the pixel is substantially equal to zero; and
    performing a field extension deinterlacing operation to the pixel if the motion value detected for the pixel is not substantially equal to zero.

4. The method of claim 1, further comprising detecting cadence of each pixel of the field, wherein the field includes pixels of difference cadences.

5. The method of claim 1, wherein the detecting further comprises:
    obtaining a pixel matrix from (1) the field, (2) a first and a second preceding field of the field, and (3) a subsequent field of the field, wherein the pixel matrix is centered on the pixel position of the pixel, wherein the first preceding field and the subsequent field are adjacent to the field while the second preceding field is adjacent to the first preceding field; and
    detecting the cadence of the pixel by (1) determining if the pixel matrix of the field matches the pixel matrix of one of the first and second preceding fields that is of the same type as the field, and (2) determining a comb factor of the pixel matrix of the field when combined with the pixel matrix of each of the first preceding field and the subsequent field.

6. The method of claim 5, wherein the detecting the cadence of the pixel further comprises
    determining that the detected cadence is an odd cadence if the pixel matrix of the field matches the pixel matrix of the second preceding field that is of the same type as the field and if the cadence of prior pixels at the same position of the pixel of the field is also detected as the odd cadence; and
    determining that the detected cadence is an even cadence if the comb factor between the pixel matrix of the field and the pixel matrix of the first preceding field and the comb factor between the pixel matrix of the field and the pixel matrix of the subsequent field as well as the comb factors for prior pixels at the same position as the pixel of the field follow a pre-determined repeating sequence pattern.

7. The method of claim 1, further comprising:
    performing a field combination deinterlacing operation to the pixel if cadence is detected in the pixel; and
    performing a field extension deinterlacing operation to the pixel if no cadence is detected in the pixel.

8. A motion adaptive deinterlacer, comprising:
    a motion and cadence detection module to detect motion value and cadence of a pixel in a field of an interlaced video that includes a plurality of consecutive fields;
    a field combination deinterlacing module to deinterlace the pixel in accordance with the cadence detected if the motion and cadence detection module detects cadence in the pixel; and
    a field extension deinterlacing module to deinterlace the pixel if the motion and cadence detection module does not detect cadence in the pixel.

9. The motion adaptive deinterlacer of claim 8, wherein the motion and cadence detection module combines the motion value and the cadence of the pixel into a single data packet for storage in memory before being used for deinterlacing the pixel.

10. The motion adaptive deinterlacer of claim 8, wherein the motion and cadence detection module detects cadence of each pixel of the field, wherein the field includes pixels of difference cadences.

11. The motion adaptive deinterlacer of claim 8, wherein the motion and cadence detection module further comprises:
    a pixel-based comparator and motion estimation logic to determine the motion value of the pixel; and
    a pixel-based multi-cadence detection logic to detect the cadence of the pixel of the field by
    obtaining a pixel matrix from (1) the field, (2) a first and a second preceding field of the field, and (3) a subsequent field of the field, wherein the pixel matrix is centered on the pixel position of the pixel in those fields, wherein the first preceding field and the subsequent field are adjacent to the field while the second preceding field is adjacent to the first preceding field; and
    detecting the cadence of the pixel by (1) determining if the pixel matrix of the field matches the pixel matrix of one of the first and second preceding fields that is of the same type as the field, and (2) determining a comb factor of the pixel matrix of the field when combined with the pixel matrix of each of the first preceding field and the subsequent field.

12. The motion adaptive deinterlacer of claim 11, wherein the pixel-based multi-cadence detection logic
    detects the cadence being an odd cadence if the pixel matrix of the field matches the pixel matrix of the second preceding field that is of the same type as the field and if the cadence of prior pixels at the same position of the pixel of the field is also detected to have the odd cadence, and detects the cadence being an even cadence if the comb factor between the pixel matrix of the field and the pixel matrix of the first preceding field and the comb factor between the pixel matrix of the field and the pixel matrix of the subsequent field as well as the comb factors for prior pixels at the same position as the pixel of the field follow a pre-determined repeating sequence pattern.

13. A non-transitory computer-readable medium including a sequences of instructions stored thereon for causing a computer to perform a motion adaptive deinterlacing function to an interlaced video having a plurality of fields, comprising:
  detecting motion value of a pixel of a field from the fields of the interlaced video
  detecting cadence of the pixel independent of other pixels of the field;
  combining the motion value and the cadence of the pixel into a single data packet for storage in memory before being used for deinterlacing; and
  deinterlacing the interlaced video at the pixel in accordance with the motion and cadence of the pixel detected.

14. The non-transitory computer-readable medium of claim 13, further comprising detecting cadence of each pixel of the field, wherein the field includes pixels of difference cadences.

15. The non-transitory computer-readable medium of claim 13, wherein the deinterlacing further comprises:
  performing a field combination deinterlacing operation to the pixel in accordance with the cadence detected if the motion value for the pixel is substantially equal to zero; and
  performing a field extension deinterlacing operation to the pixel if the motion value detected for the pixel is not substantially equal to zero.

16. A non-transitory computer-readable medium including a sequence of instructions stored thereon for causing a computer to execute a method comprising:
  detecting cadence of a pixel of a field from fields of an interlaced video independent of other pixels of the field; and
  deinterlacing the interlaced video at the pixel in accordance with the cadence of the pixel detected.

17. The non-transitory computer-readable medium of claim 1, wherein the method further comprises:
  detecting motion value of the pixel; and
  combining the motion value and the cadence of the pixel into a single data packet for storage in memory before being used for deinterlacing.

18. The non-transitory computer-readable medium of claim 17, wherein the deinterlacing further comprises
  performing a field combination deinterlacing operation to the pixel in accordance with the cadence detected if the motion value for the pixel is substantially equal to zero; and
  performing a field extension deinterlacing operation to the pixel if the motion value detected for the pixel is not substantially equal to zero.

19. The non-transitory computer-readable medium of claim 16 further comprising detecting cadence of each pixel of the field, wherein the field includes pixels of difference cadences.

20. The non-transitory computer-readable medium of claim 16, wherein the detecting further comprises:
  obtaining a pixel matrix from (1) the field, (2) a first and a second preceding field of the field, and (3) a subsequent field of the field, wherein the pixel matrix is centered on the pixel position of the pixel, wherein the first preceding field and the subsequent field are adjacent to the field while the second preceding field is adjacent to the first preceding field; and
  detecting the cadence of the pixel by (1) determining if the pixel matrix of the field matches the pixel matrix of one of the first and second preceding fields that is of the same type as the field, and (2) determining a comb factor of the pixel matrix of the field when combined with the pixel matrix of each of the first preceding field and the subsequent field.

21. The non-transitory computer-readable medium of claim 20, wherein detecting the cadence of the pixel further comprises:
  determining that the detected cadence is an odd cadence if the pixel matrix of the field matches the pixel matrix of the second preceding field that is of the same type as the field and if the cadence of prior pixels at the same position of the pixel of the field is also detected as the odd cadence; and
  determining that the detected cadence is an even cadence if the comb factor between the pixel matrix of the field and the pixel matrix of the first preceding field and the comb factor between the pixel matrix of the field and the pixel matrix of the subsequent field as well as the comb factors for prior pixels at the same position as the pixel of the field follow a pre-determined repeating sequence pattern.

* * * * *